Oct. 22, 1957 C. S. SEMAR 2,810,153
TORQUE ROD DOOR COUNTERBALANCE
Filed March 30, 1953 2 Sheets-Sheet 1
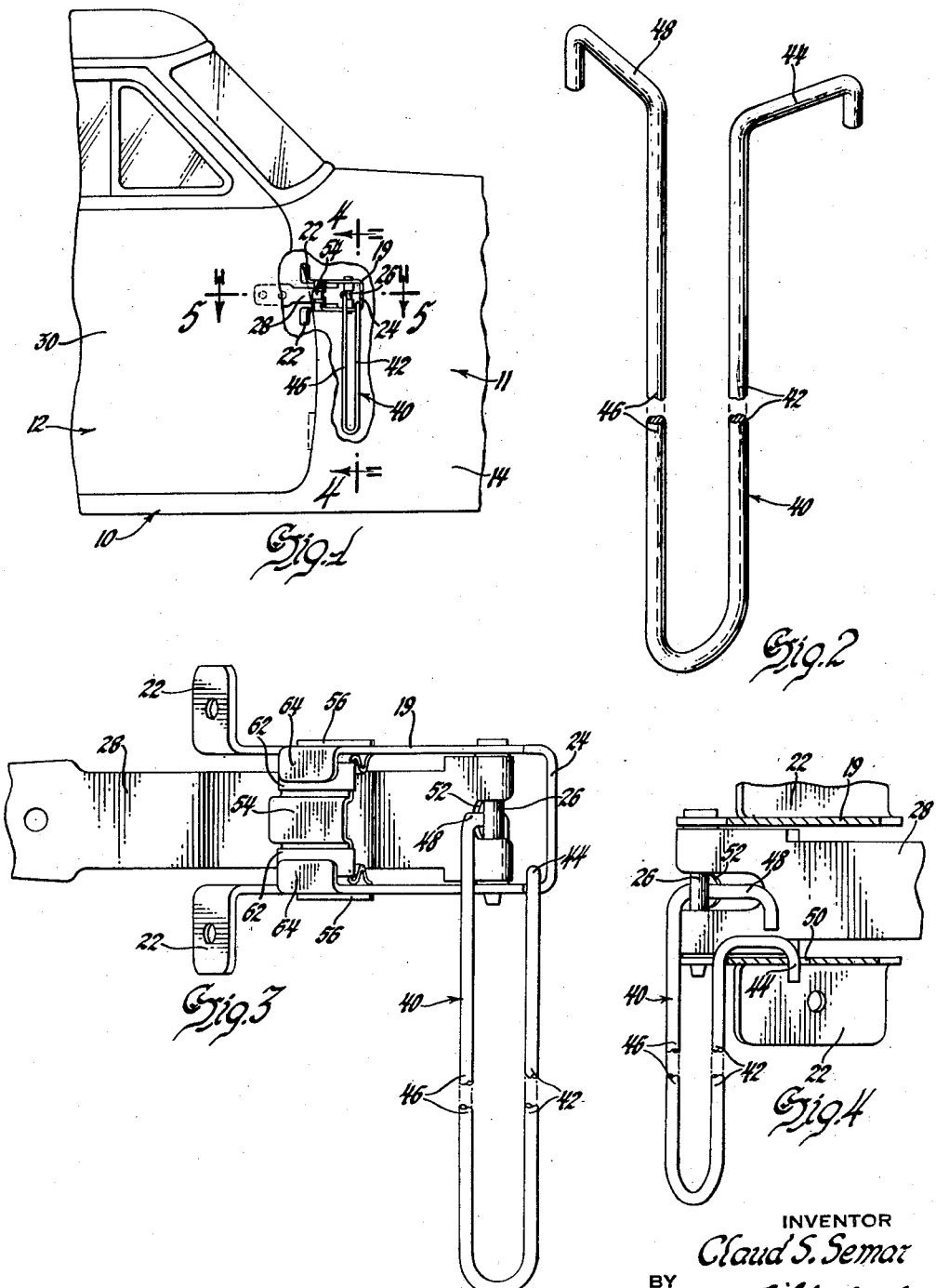
INVENTOR
Claud S. Semar
BY
Paul Fitzpatrick
ATTORNEY

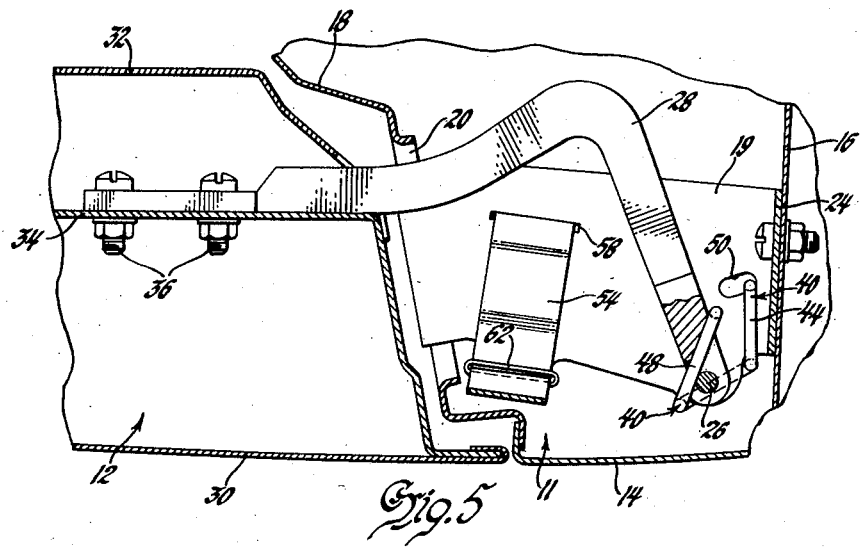
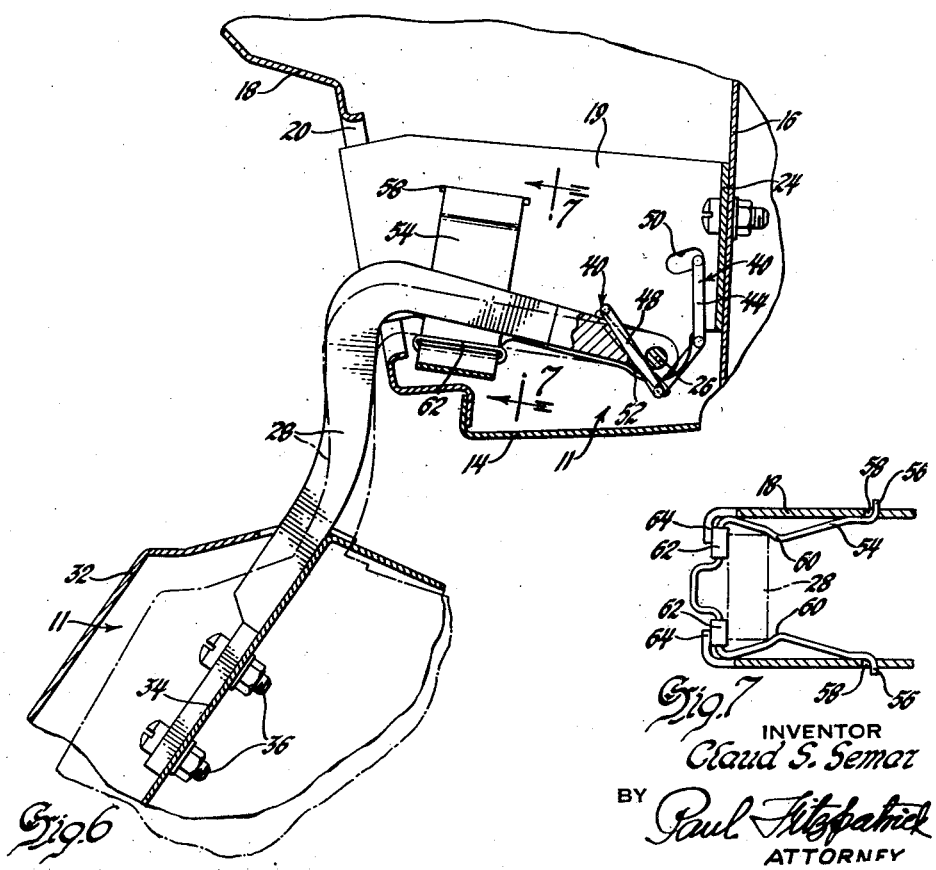

United States Patent Office 2,810,153
Patented Oct. 22, 1957

2,810,153

TORQUE ROD DOOR COUNTERBALANCE

Claud S. Semar, Birmingham, Mich., assignor to General Motors Corporation, Detroit, Mich., a corporation of Delaware Application March 30, 1953, Serial No. 345,309

3 Claims. (Cl. 16—180)

This invention relates to a door counterbalance, and more particularly to an improved hinge and counterbalance combination for an automobile door.

One feature of the invention is that it provides an improved door hinge and counterbalance; another feature of the invention is that it provides a door hinge and counterbalance particularly adapted for use in an automobile body where the space inside the body hinge pillar is limited; a further feature of the invention is that the counterbalance comprises an elongated spring rod which is folded into the form of a U and has its ends secured to the respective door and body elements of one of the hinges, the rod being twisted when the door is closed to provide a torque force urging the door open; an additional feature is that the rod is loaded during assembly with the hinge; and still another feature of the invention is that the hinge and counterbalance structure may be assembled and then subsequently mounted as an integral unit inside the automobile body.

Other features and advantages of the invention will be apparent from the following description and from the accompanying drawings, in which:

Fig. 1 is a fragmentary side elevational view of an automobile utilizing the invention, a portion of the outer body panel and outer door panel being broken away to show the underlying structure;

Fig. 2 is an enlarged view, partly broken away, of the folded torque rod counterbalance;

Fig. 3 is an enlarged view, partly broken away, of the structure shown in Fig. 1;

Fig. 4 is a fragmentary view looking from the right of Fig. 3 and taken along the line 4—4 of Fig. 1;

Fig. 5 is an enlarged horizontal section taken along the line 5—5 of Fig. 1;

Fig. 6 is a sectional view similar to Fig. 5, but showing the position of the parts with the door open; and Fig. 7 is a detail section taken along the line 7—7 of Fig. 6.

Most modern automobiles are provided with so called "tumble-in" doors which have the hinge axis inclined so that the door tends to close by gravity. For example, the front edge of the door may rise three or four inches when the door is moved from closed position to open position. This construction makes it easier to close the door and also permits the door to be opened when the car is parked next to a curb or other obstruction. Since the door is quite heavy, a counterbalance device preferably is provided to offset partially the weight of the door so that the door is easy to open. The invention provides a novel and improved door counterbalance which has the advantage of easy assembly before the door is mounted on the body, and which is particularly adapted for use in automobiles having narrow body pillars with no room for a heavy coil spring type counterbalance.

Referring now more particularly to the drawings, an automobile 10 has a body 11 upon which is hingedly mounted a door 12. As shown best in Figs. 5 and 6 the body 11 has an outer fender panel 14 forming part of a body hinge pillar having an inner mounting wall 16 and an outer hinge face wall 18 provided with an opening 20.

The door 12 is hingedly mounted on the body by means of a pair of vertically spaced hinges, the upper one of which is shown in detail in the drawings. A U-shaped hinge box 19 forms a body hinge element and extends through the opening 20 to the interior of the hinge pillar. Box 19 has flanges 22 which are bolted to the wall 18, and the base 24 of the hinge box is bolted to the hinge pillar wall 16 so that the hinge box is effectively integral with the automobile body.

A hinge pin 26 is mounted between the arms of the hinge box adjacent the base 24 thereof and provides a pivotal support for a goose-neck hinge strap 28 which projects out through the opening 20 and to which the door 12 is secured, said door having an outer panel 30 and an inner panel 32 and a supporting bracket 34 upon which the free end of the hinge strap 28 is mounted by means of bolts 36.

As pointed out above, the hinge axis of the door is generally inclined so that the free or unhinged end of the door rises when the door is open, and the door tends to close by gravity. In order to offset this tendency of the door to close and to make it easy to open the door, a door counterbalance is provided for exerting a force to urge the door toward open position. This counterbalance comprises an elongated torque or spring rod designated generally at 40. The rod 40 is folded into the form of a U having an arm 42 which terminates in a hook portion 44 and an arm 46 which terminates in a hook portion 48. The folded torque rod is assembled with the upper door hinge before the door is mounted on the automobile body, and the unitary hinge and counterbalance assembly may readily be mounted on the body by threading the folded torque rod 40 through the opening 20 in the hinge face of the hinge pillar so that the hinge and counterbalance assembly is concealed. The lower arm of the hinge box 19 is provided with a slot 50 into which the hook 44 on the arm 42 of the torque rod is inserted, and the strap 28 is formed with a groove 52 (see Figs. 3 and 4) adjacent the hinge pin 26, the hook portion 48 on the arm 42 of the torque rod extending through said groove from one side of the strap to the other side thereof and engaging the strap to secure the torque rod to the hinge.

The hook portions 44 and 48 form an angle such that the torque rod must be twisted or preloaded through an angle of the order of 25 degrees in order to mount the torque rod on the hinge when the hinge parts are in door-open position, and, therefore, the spring force of the rod holds the torque rod 40 on the hinge before the door is mounted. With the hinge and holdopen assembly mounted on the body, when the door is closed as shown in Fig. 5, the rod is twisted further from its free or unstressed position, usually through an angle of the order of 56 degrees, which is the angle through which the automobile front door moves between open and closed positions. When the door is moved to open position the movement is aided by the energy stored in the torque rod.

Figs. 6 and 7 show the position of the parts when the door is open, Fig. 6 showing the door and associated parts in the normal holdopen position in solid lines and showing the parts in broken lines when the door has been thrown open beyond its normal holdopen position to a fully open position.

In order to hold the door in open position, a door check and holdopen device is provided comprising a spring element 54 mounted within the arms of the box 19. While the holdopen spring may be riveted or otherwise fixedly secured to the hinge box 19, in the drawings it is shown as being secured by means of ears 56 which are turned out at its free end and which are received in slots 58 in the walls of the hinge box. The spring 54 is formed with sloping cam surfaces 60 on each arm, and rubber sleeves 62 are carried on the shoulders or base portion of the spring. One side of these sleeves abuts ears 64 which are turned from the hinge box, and the other side of the sleeves are engaged by the strap 28 when the door is open to provide a door check or stop. When the door is thrown open, the yieldability of the rubber sleeves permits the door to move beyond its holdopen position, as shown in broken lines in Fig. 6, and the cam surfaces 60 on the yieldable spring 54 provide a yieldable holdopen so that the door will be maintained open despite the fact that the force of the torque rod counterbalance 40 may not be sufficient to overcome the weight and gravitational force exerted by the door when it is open.

The folded or U-shaped torque rod which comprises the door counterbalance is advantageous in several respects; first, the counterbalance is very easily assembled with the hinge elements before the door is mounted, and the unitary assembly of hinge and counterbalance is held together since the torque rod is stressed or preloaded when it is mounted. After assembly of the hinge and counterbalance the structure may readily be mounted on the automobile body, since the elongated folded torque rod may easily be threaded through the hinge box opening 20 in the hinge pillar. The torque rod provides the substantial force which is necessary to counterbalance the heavy door without adding any appreciable bulk to the hinge box arrangement, and this is important in modern automobiles having narrow door pillars lacking space to house bulky coil springs. In addition, the folded torque rod provides the advantages of a straight spring twice as long as the folded torque rod. Tests have shown that a straight rod which may be connected between the upper and lower hinges will break down due to fatigue in the spring metal, while the folded torque rod, which may be twice as long as a straight rod, is housed in a smaller space and will withstand the severest cycling test without failure.

While I have shown and described one embodiment of my invention, it is capable of many modifications. Changes, therefore, in the construction and arrangement may be made without departing from the spirit and scope of the invention as set forth in the appended claims.

I claim:

1. A door hinge and counterbalance comprising, a hinge box having opposite side walls, a hinge strap having a bifurcated end received between the opposite side walls of said box, a hinge pin extending through said hinge strap end and being secured to the side walls of said box swingably mounting said strap on said box, and a generally U-shaped torsion spring having the legs thereof disposed on opposite sides of said hinge strap and provided with laterally extending crank ends, one of said crank ends being secured to one of said side walls of said box at one side of said hinge strap and the other of said crank ends extending through said bifurcated end of said strap from the other side of said strap to the one side thereof and being secured to said strap at the one side thereof, said crank ends being twisted toward each other to the one side of said hinge strap whereby said torsion spring exerts a torque force biasing said hinge strap about the pivotal axis in a direction allowing said crank ends to move apart relative to each other.

2. A door hinge and counterbalance comprising, a hinge box having opposite side walls, a hinge strap having a bifurcated end received between the opposite side walls of said box, a hinge pin extending through said hinge strap end and being secured to the side walls of said box for swingably mounting said strap on said box for movement about a substantially fixed pivotal axis, and a generally U-shaped torsion spring having the legs thereof disposed on opposite sides of said hinge strap in generally parallel spaced relationship to the pivotal axis thereof and provided with laterally extending hook-shaped crank arms, one of said arms being secured to one of said side walls of said box at one side of said hinge strap and the other of said crank arms extending through said bifurcated end of said strap from the other side of said strap to the one side thereof and being secured to said strap at the one side thereof, said crank arms being twisted toward each other to the one side of said hinge strap whereby said torsion spring exerts a torque force biasing said hinge strap about the pivotal axis thereof in a direction allowing said crank arms to move apart relative to each other.

3. A door hinge and counterbalance comprising, a hinge box having opposite side walls, a hinge strap having a slot at one end thereof providing spaced hinge bosses, a hinge pin extending through said bosses and being secured to the side walls of said box for swingably mounting said strap on said box for movement about a substantially fixed pivotal axis, and a generally U-shaped torsion spring having the legs thereof disposed on opposite sides of said hinge strap and provided with laterally extending crank arms, one of said crank arms being secured to one of the side walls of said box at one side of said hinge strap and the other of said crank arms extending through said slotted end of said strap from the other side of said strap to the one side thereof in engagement with the end of said slot and being secured to said strap at the one side thereof, said crank arms being twisted toward each other to the one side of said hinge strap whereby said torsion spring exerts a torque force biasing said hinge strap about the pivotal axis thereof in a direction allowing said crank arms to move apart relative to each other.

References Cited in the file of this patent

UNITED STATES PATENTS

| | | |
|---|---|---|
| 157,813 | Griffith | Dec. 15, 1874 |
| 167,888 | Fredenburgh | Sept. 21, 1875 |
| 908,941 | Boswell | Jan. 5, 1909 |
| 1,154,538 | Offutt | Sept. 21, 1915 |
| 1,585,653 | Dath | May 25, 1926 |
| 2,219,821 | Schonitzer | Oct. 29, 1940 |
| 2,219,825 | Schonitzer | Oct. 29, 1940 |
| 2,284,320 | Howe | May 26, 1942 |
| 2,342,531 | Dean | Feb. 22, 1944 |
| 2,616,757 | Doty et al. | Nov. 4, 1952 |
| 2,688,764 | Squire | Sept. 14, 1954 |
| 2,707,799 | Butterfield | May 10, 1955 |